Figure 1:
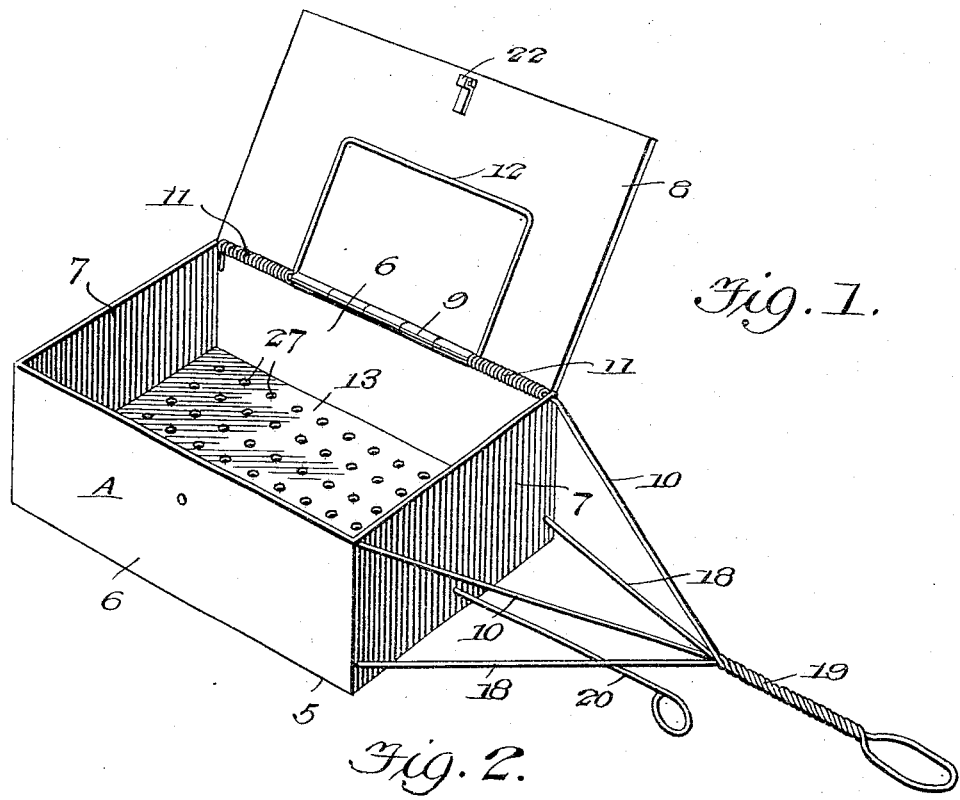

J. A. McCLARRINON.
CORN POPPER.
APPLICATION FILED AUG. 7, 1915.

1,198,938.

Patented Sept. 19, 1916.
2 SHEETS—SHEET 1.

Witnesses
Hugh H. Ott
Edward Yeager

Inventor
J. A. McClarrinon
By Victor J. Evans
Attorney

J. A. McCLARRINON.
CORN POPPER.
APPLICATION FILED AUG. 7, 1915.
1,198,938.
Patented Sept. 19, 1916.
2 SHEETS—SHEET 2.
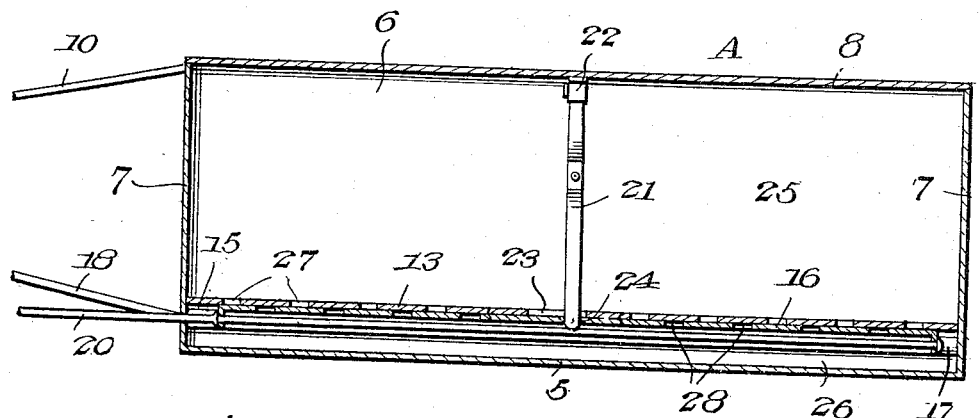
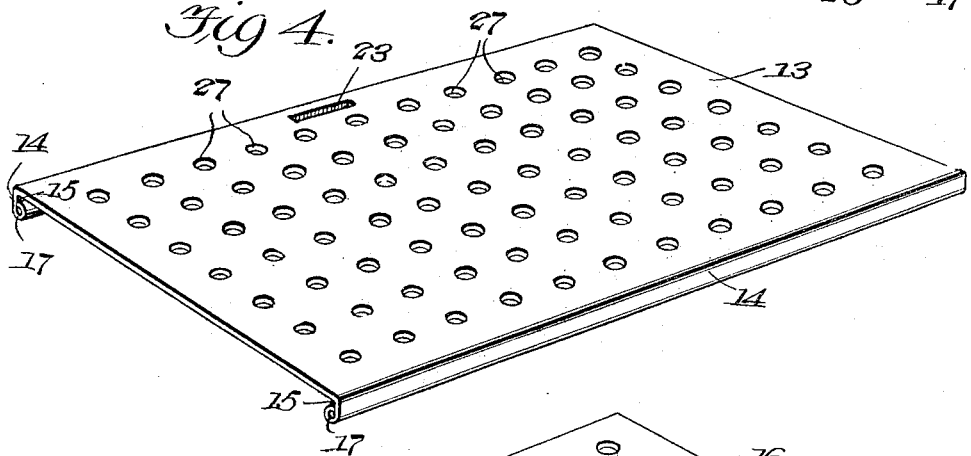
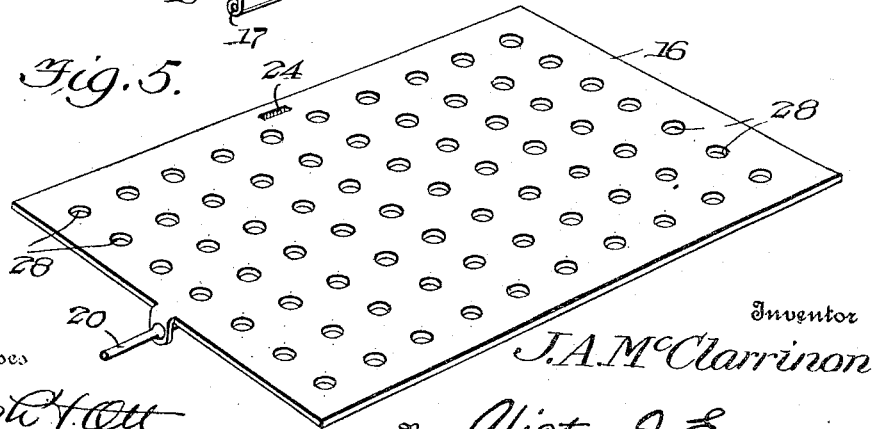
Witnesses
Hugh H. Ott
Edward ?
Inventor
J. A. M?Clarrinon
By Victor J. Evans
Attorney

UNITED STATES PATENT OFFICE.

JOHN A. McCLARRINON, OF ARLINGTON, IOWA.

CORN-POPPER.

1,198,938.  Specification of Letters Patent.  Patented Sept. 19, 1916.

Application filed August 7, 1915. Serial No. 44,268.

*To all whom it may concern:*

Be it known that I, JOHN A. McCLARRINON, a citizen of the United States, residing at Arlington, in the county of Fayette and State of Iowa, have invented new and useful Improvements in Corn-Poppers, of which the following is a specification.

This invention relates to corn poppers and has particular reference to a hand operated device.

The primary object of the invention resides in the provision of a device of this character embodying a receptacle associated with other elements, whereby the unpopped kernels can be separated from the popped corn and independently removed from the receptacle when desired, thereby obviating burning or scorching of the already popped corn, which is commonly the result when the same is retained in the receptacle an undue length of time.

The invention further contemplates a construction wherein the receptacle is divided into compartments for the reception of the popped and unpopped corn when separated, whereby the latter can be removed from the receptacle independently of the former, together with means for automatically opening the cover of the receptacle when desired.

Other objects will appear as the nature of the invention is better understood from the following description, wherein the specific construction, combination and arrangement of parts are fully set forth, and clearly defined in the appended claims.

In the drawings forming part of this application like numerals of reference indicate similar parts in the several views and wherein:—

Figure 2:
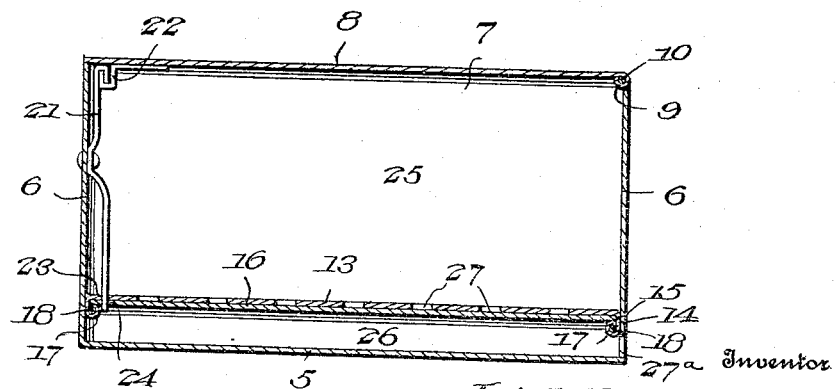

Figure 1 is a perspective view of the device with the cover in normal elevated position. Fig. 2 is a transverse sectional view therethrough with the cover in closed position. Fig. 3 is a longitudinal sectional view therethrough. Fig. 4 is a detail perspective view of the auxiliary bottom. Fig. 5 is a similar view of the slide plate.

A device constructed in accordance with my invention essentially consists of a receptacle A, preferably constructed from sheet metal in any desired form, but as shown in this particular instance is substantially rectangular in cross sectional configuration and includes a bottom 5, front and rear walls 6, end walls 7, and a cover 8.

The upper edge of the rear wall 6 is provided with a cut away portion for the reception of the rolled back portion 9 of the adjacent edge of the cover 8, and through which rolled back portion is extended one of the parallel rods 10 which constitutes a hinge support for the cover 8, the other of the parallel rods 10 extending through the rolled back upper edge portion of the front wall 6. Coiled about the rod 10 at the opposite sides of the rolled back portion 9 of the cover are the terminals of a spring 11, having its intermediate portion 12 engaging the under side of the cover 8 to normally maintain the latter in opened position.

Supported in any suitable manner within the receptacle A and spaced from the bottom 5 thereof, is a perforated auxiliary bottom 13 having longitudinally disposed depending flanges 14 extending inwardly a slight distance to provide guide grooves 15 in which is slidably mounted the perforated plate 16. The terminals of the flanges 14 are rolled upon themselves as at 17 for the reception of the parallel rods 18, which together with the rods 10 extend to a common point beyond the end wall 7 and are intertwisted as at 19 to provide a handle for the receptacle. Suitably secured in any suitable manner to the plate 16 is a rod 20 projecting outwardly from one end of the receptacle and terminating at a point adjacent the handle 19, the rod 20 constituting a handle for adjusting the plate when desired for the purpose to be hereinafter described.

Pivotally mounted within the receptacle upon the front wall 6, is a vertically disposed hook-like element 21 adapted to engage the hook-like element 22 secured to the under face of the cover 8 and depending therefrom for the purpose of holding the cover in closed position against the tension of the spring 11. The element 21 has its lower edge portion depending through an elongated slot 23 in the auxiliary bottom 13, and fitted within a recess 24 in the adjacent edge of the sliding plate 16. By reason of this construction it will be manifest that the element 21 will be moved into and out of engagement with the element 22 upon adjustment of the plate 16 in opposite directions, and that subsequent to the release of the cover by adjustment of the plate in one direction the spring 11 operates to automatically elevate the cover to opened position.

Obviously the auxiliary bottom 13 divides the receptacle into upper and lower compartments 25 and 26 respectively which may communicate with each other through the openings 27 in the bottom. However when the plate 16 is in normal position beneath the bottom the openings 28 therein are disposed out of registry with the openings 27 in the bottom 13 thereby cutting off communication between the said upper and lower compartments. In this position of parts the device is ready for use, the unpopped corn being arranged in the upper compartment 25 and the cover 8 subsequently locked in closed position in the manner hereinabove described. The receptacle is then agitated in the usual well known manner, and after the compartment 25 in which the corn is being popped becomes filled or partly filled the popped corn may be separated from the unpopped kernels and independently removed from the receptacle when desired. In this connection it is only necessary to withdraw the plate 16 outwardly a slight distance to bring the openings 28 thereof in registry with the openings 27 in the auxiliary bottom 13, which openings are sufficiently large to permit the unpopped kernels to pass freely therethrough into the lower compartment 26. It is of course to be understood that as the receptacle is agitated, subsequent to this adjustment of the plate 16, the unpopped kernels within the compartment 25, and held among the popped corn are shaken through the openings in the auxiliary bottom and plate 16 and enter the lower compartment 26. During the movement of the plate 16 in an outward direction the locking element 21 is swung upon its pivot out of engagement with the element 22 carried by the cover, thereby releasing the latter which is automatically elevated to opened position under the action of the spring 11. The popped product may now be emptied from the receptacle by tilting the latter in the direction of the front wall, after which the receptacle may be tilted in a reverse direction toward the rear wall to permit the unpopped kernels now contained in the compartment 26 to be discharged therefrom through a suitable opening 27$^a$ in the rear wall 6 at a point below the auxiliary bottom 13. The plate 16 may then be moved to normal position and the unpopped kernels removed from the lower compartment 26 and again arranged within the compartment 25 to be popped. Manifestly with a device of this nature any quantity of the popped product may be removed from the upper compartment 25 when desired, with a view of preventing scorching or burning of the same which is oftentimes the result, when the popped product is retained within the receptacle until all the kernels are popped, some of which are very slow in popping, or by being imperfect do not pop at all. The device is extremely simple in its make-up and may be easily and conveniently handled in the manner hereinabove described.

It is believed that from the foregoing description the nature and advantages of the invention will be thoroughly understood without requiring a more extended explanation and therefore the same has been omitted. However I desire to have it understood that I do not limit myself to the precise construction and arrangement of parts herein illustrated and described, and that various changes may be resorted to when desired as fall within the scope of the appended claims.

What is claimed is:—

1. A corn popper comprising a receptacle, an auxiliary perforated bottom arranged within the receptacle, and spaced from the bottom thereof, said auxiliary bottom dividing the receptacle into communicating compartments, a perforated plate slidably mounted beneath said auxiliary bottom and controlling the communication between said compartments, and a cover for said receptacle.

2. A corn popper comprising a receptacle, a hinged cover therefor, means for holding said cover in closed position, an auxiliary perforated bottom arranged within the receptacle and spaced from the bottom thereof, said auxiliary bottom dividing the receptacle into communicating compartments, a perforated plate slidably mounted beneath the auxiliary bottom for controlling the communication between the compartments, and a connection between said cover holding means and said plate whereby the former is released upon adjustment of the plate in one direction.

3. A corn popper comprising a receptacle, an auxiliary perforated bottom arranged within the receptacle, and spaced from the bottom thereof, said auxiliary bottom dividing the receptacle into communicating compartments, a perforated plate slidably mounted beneath said auxiliary bottom and controlling the communication between said compartments, a cover for said receptacle, and means for automatically raising said cover to opened position when the latter is released.

4. A corn popper comprising a receptacle, a hinged cover therefor, means for holding said cover in closed position, an auxiliary perforated bottom arranged within the receptacle and spaced from the bottom thereof, said auxiliary bottom dividing the receptacle into communicating compartments, a perforated plate slidably mounted beneath said auxiliary bottom, said plate cutting off the communication between the compartments when in normal position, means for adjusting said plate to establish communication between said compartments, and a connection between said cover holding means and the plate for effecting a release of the cover upon adjustment of the said plate.

5. A corn popper comprising a receptacle, a hinged cover therefor, means for holding said cover in closed position, an auxiliary perforated bottom arranged within the receptacle and spaced from the bottom thereof, said auxiliary bottom dividing the receptacle into communicating compartments, a perforated plate slidably mounted beneath said auxiliary bottom for controlling the communication between said compartments, a connection between said cover holding means and said plate whereby the former is simultaneously released upon adjustment of the plate in one direction, and means for automatically raising said cover to opened position upon release of the same.

In testimony whereof I affix my signature in presence of two witnesses.

JOHN A. McCLARRINON.

Witnesses:
HERMAN SCHOEPFE,
H. R. YOUNG.

Copies of this patent may be obtained for five cents each, by addressing the "Commissioner of Patents, Washington, D. C."